(12) United States Patent
Xu et al.

(10) Patent No.: US 11,662,276 B2
(45) Date of Patent: May 30, 2023

(54) FATIGUE TEST EQUIPMENT FOR AUTOMOBILE CHASSIS SIMULATION ROAD TEST

(71) Applicant: CITIC Dicastal Co., Ltd., Qinhuangdao (CN)

(72) Inventors: Zuo Xu, Qinhuangdao (CN); Desheng Chen, Qinhuangdao (CN); Qiang Liu, Qinhuangdao (CN); Shide Li, Qinhuangdao (CN); Chunhai Liu, Qinhuangdao (CN); Hanqi Wu, Qinhuangdao (CN)

(73) Assignee: CITIC Dicastal Co., Ltd., Qinhuangdao (CN)

( * ) Notice: Subject to any disclaimer, the term of this patent is extended or adjusted under 35 U.S.C. 154(b) by 24 days.

(21) Appl. No.: 17/368,273

(22) Filed: Jul. 6, 2021

(65) Prior Publication Data

US 2022/0316993 A1 Oct. 6, 2022

(30) Foreign Application Priority Data

Apr. 1, 2021 (CN) .......................... 202110353839.3

(51) Int. Cl.
*G01M 17/04* (2006.01)
(52) U.S. Cl.
CPC ................................ *G01M 17/045* (2013.01)
(58) Field of Classification Search
CPC .............................. G01M 17/04; G01M 17/045
See application file for complete search history.

(56) References Cited

U.S. PATENT DOCUMENTS

| | | | | |
|---|---|---|---|---|
| 3,899,917 A * | 8/1975 | Kisbany | ................... | G01N 3/56 73/8 |
| 3,977,243 A * | 8/1976 | Yamada | .............. | G01M 17/022 73/146 |
| 4,030,961 A * | 6/1977 | Straeten | ............ | B32B 17/10862 100/211 |
| 4,938,055 A * | 7/1990 | Tsuda | ....................... | G01N 3/56 73/146 |
| 5,703,284 A * | 12/1997 | Gerhards | .............. | G01M 17/02 73/146 |
| 6,116,084 A * | 9/2000 | Fischer | ................ | G01M 17/022 73/146 |
| 6,382,020 B1 * | 5/2002 | Fischer | ................ | G01M 17/022 73/146 |
| 6,622,550 B1 * | 9/2003 | Jenniges | ............. | G01M 17/022 73/129 |
| 2004/0050150 A1 * | 3/2004 | Jahn | ................... | G01M 17/0074 73/146 |
| 2008/0275682 A1 * | 11/2008 | Langer | .............. | G01M 17/0072 703/8 |

(Continued)

*Primary Examiner* — Eric S. McCall
(74) *Attorney, Agent, or Firm* — IPro, PLLC

(57) ABSTRACT

The present disclosure belongs to the field of automobile chassis suspension system tests, and provides fatigue test equipment for an automobile chassis simulation road test. The fatigue test equipment can simultaneously test the simulation road test fatigue durability of automobile chassis parts such as the wheel and suspension system and the like, ensures that a test state of the tested wheel and suspension system is close to a real automobile state, and simulates and reproduces a load which an automobile chassis bears in the real road running process in a laboratory.

16 Claims, 4 Drawing Sheets

(56) References Cited

U.S. PATENT DOCUMENTS

| | | | |
|---|---|---|---|
| 2010/0031740 A1* | 2/2010 | Olex | G01M 17/013 |
| | | | 73/146 |
| 2012/0204633 A1* | 8/2012 | Martin | G01M 17/024 |
| | | | 73/146 |
| 2013/0055804 A1* | 3/2013 | Preising | G01M 13/021 |
| | | | 73/116.01 |
| 2014/0109662 A1* | 4/2014 | Koide | G01M 17/022 |
| | | | 73/118.01 |
| 2014/0311231 A1* | 10/2014 | Braghiroli | G01M 1/04 |
| | | | 73/146 |
| 2016/0327455 A1* | 11/2016 | Miyazawa | G01M 17/013 |
| 2017/0153163 A1* | 6/2017 | Okada | G01M 17/021 |
| 2017/0234774 A1* | 8/2017 | Fujiwara | G01M 17/021 |
| | | | 73/146 |
| 2017/0284900 A1* | 10/2017 | Eguchi | G01M 17/022 |
| 2017/0299471 A1* | 10/2017 | Eguchi | G01M 1/16 |
| 2017/0363558 A1* | 12/2017 | Kost | G01N 27/20 |
| 2018/0340864 A1* | 11/2018 | Zheng | G01M 17/013 |
| 2019/0086292 A1* | 3/2019 | Okada | B60C 19/00 |
| 2019/0204185 A1* | 7/2019 | Bösl | G01M 17/022 |
| 2019/0204186 A1* | 7/2019 | Eisenbeiss | G01M 17/022 |
| 2019/0331556 A1* | 10/2019 | Knestel | G01M 17/045 |
| 2020/0408643 A1* | 12/2020 | Mizuta | G01M 1/225 |

* cited by examiner

FATIGUE TEST EQUIPMENT FOR AUTOMOBILE CHASSIS SIMULATION ROAD TEST

TECHNICAL FIELD

The present application relates to the field of automobile chassis suspension system tests, in particular to fatigue test equipment for an automobile chassis simulation road test.

BACKGROUND

A fatigue durability road test of an overall automobile chassis belongs to the final link of automobile development, generally is carried out in a professional test field and needs to use a finished automobile, work fatigue strength of automobile test personnel is high, the period is very long, the test cost is high, and once parts have failures, high development cost and serious progress losses will be caused, and thus, before a finished automobile road test is carried out, reliability verification of an automobile chassis part level and a system level needs to be carried out in a test room.

In order to verify the fatigue durability of a wheel, generally, tests of radial fatigue, bending fatigue and biaxial fatigue of a simulation road test are adopted to carry out verification in the test room, but in those bench tests, only the wheel is mounted, there is no consideration of the buffering effect of a suspension on a load which the wheel bears, and there may be a certain deviation between test results and a real automobile result. In order to verify the fatigue durability of an automobile chassis system, an axis coupling road simulation test of a quarter suspension system, a half vehicle or a whole chassis can be carried out in the test room, but in the test, the wheel is not mounted, loading is carried out at a shaft head, wheel performance cannot be investigated, the test has high requirements for iteration evaluation, patch measurement, data analysis and the like, and the test cost is also high.

SUMMARY

In order to simultaneously test the simulation road test fatigue durability of automobile chassis parts such as a wheel and suspension system and the like in one bench test, the present disclosure provides fatigue test equipment for an automobile chassis simulation road test, which can really simulate a real automobile stress state of the automobile wheel and suspension system in a test field, and simultaneously test the fatigue durability of the wheel and suspension system.

In order to achieve the objective above, the present disclosure provides the following technical solution:

An embodiment of the present disclosure provides fatigue test equipment for an automobile chassis simulation road test, including a suspension assembly, a loading system, a high-speed pavement rotary drum assembly, an impact pavement rotary drum assembly and a rotary drum switching assembly. The suspension assembly is mounted on the loading system, and the suspension assembly can be loaded onto the high-speed pavement rotary drum assembly and the impact pavement rotary drum assembly through a wheel; and the rotary drum switching assembly can enable the wheel fixed on the suspension assembly to be switched between the high-speed pavement rotary drum assembly and the impact pavement rotary drum assembly.

In some embodiments, the suspension assembly includes an adapter plate, a suspension fixing frame and a quarter suspension for mounting the wheel, the quarter suspension is fixed on the suspension fixing frame, and the suspension fixing frame is fixed on the adapter plate. In this embodiment, by transforming quarter suspensions of different automobile types and changing the structure and the size of the suspension fixing frame, the fatigue test equipment can adapt to suspensions of different automobile types, so that the test equipment has universality, wheel and suspension systems of various automobile types can be mounted, the fatigue durability of the wheel and suspension systems of various automobile types can be tested, the development period of a finished automobile is shortened, and the development cost is reduced.

In some embodiments, the loading system includes a lateral load loading assembly, a vertical load loading assembly, an automobile weight preliminary load loading assembly, an inclination angle loading assembly, a driving torque loading assembly and a movable plate, the lateral load loading assembly, the vertical load loading assembly, the automobile weight preliminary load loading assembly and the inclination angle loading assembly act on the movable plate, and the adapter plate is fixedly connected with the movable plate; and the driving torque loading assembly acts on a transmission shaft of the quarter suspension, and drives the wheel to rotate. The loading system in this embodiment can implement application of a wheel six-component load through each loading assembly of the loading system so as to better simulate a load which an automobile chassis bears in the real road running process.

In some embodiments, the inclination angle loading assembly includes an inclination angle machine body, an inclination angle base and an inclination angle electric cylinder, a lower end of the inclination angle machine body is fixed on the inclination angle base in a pivotable mode, a bottom end of the inclination angle electric cylinder is movably connected to the inclination angle base, a piston rod of the inclination angle electric cylinder is movably connected to the inclination angle machine body, and extension and retraction of the piston rod of the inclination angle electric cylinder can drive the inclination angle machine body to rotate around a pivoting shaft; the automobile weight preliminary load loading assembly includes a preloading motor, a first screw rod, a first sliding block and a preloading arm, the preloading motor is fixed on the inclination angle machine body, an output shaft of the preloading motor is fixedly connected with the first screw rod, the first sliding block is provided with a first threaded hole, an external screw thread of the first screw rod is matched with an internal screw thread of the first threaded hole, the first sliding block is fixed on the preloading arm, and the preloading motor can drive the first screw rod to rotate so as to implement up-and-down movement of the preloading arm; the lateral load loading assembly includes a rotation angle motor and a rotation angle loading arm, a shell of the rotation angle motor is connected with the rotation angle loading arm, a rotation shaft of the rotation angle motor is fixedly connected with the preloading arm, and the rotation angle motor can drive the rotation angle loading arm to rotate around the rotation shaft of the rotation angle motor; the vertical load loading assembly includes a hydraulic actuator, the hydraulic actuator is fixed at an upper end of the rotation angle loading arm, the movable plate is vertically fixed on the rotation angle loading arm, and a piston rod of the hydraulic actuator is connected with an upper end of the movable plate; and the driving torque loading assembly includes an acceleration torque driving shaft, an acceleration torque motor and a motor mounting table, the acceleration torque motor is fixed on the motor mounting table, an output end of the acceleration torque motor is connected with the acceleration torque driving shaft, and the acceleration torque driving shaft is fixedly connected with the transmission shaft of the quarter suspension. In this embodiment, the specific structure of each loading assembly is provided, application of an external inclination angle of the wheel is implemented by the inclination angle loading assembly, application of an automobile dead weight is implemented by the automobile weight preliminary load loading assembly, application of a lateral load to the wheel and suspension system is implemented by the lateral load loading assembly, application of a vertical bumpiness load is implemented by the vertical load loading assembly, and application of automobile driving acceleration torque is implemented by the driving torque loading assembly so as to ensure that a test state of the tested wheel and suspension system is close to a real state, and simulate and reproduce the load which the automobile chassis bears in the real road running process in a laboratory.

In some embodiments, both the preloading arm and the rotation angle loading arm are of an L shape, the shell of the rotation angle motor and a horizontal portion of the rotation angle loading arm are fixed into one whole body, and the rotation shaft of the rotation angle motor is fixed on the horizontal portion of the preloading arm.

In some embodiments, the loading system further includes a six-component force measurement platform, one surface of the six-component force measurement platform is fixed on the rotation angle loading arm, and the movable plate is fixed on the other surface of the six-component force measurement platform.

In some embodiments, a second guide rail is fixedly formed on the six-component force measurement platform, a second sliding block is arranged on the second guide rail, and the movable plate is fixed on the second sliding block.

In some embodiments, both the adapter plate and the movable plate are provided with a plurality of rows of fixing holes.

In some embodiments, the high-speed pavement rotary drum assembly includes a first rotation driving assembly and a high-speed rotary drum, and the first rotation driving assembly can drive the high-speed rotary drum to rotate. In this embodiment, rotation of the high-speed rotary drum is implemented by the first rotation driving assembly so as to drive the wheel fixed on the suspension assembly to rotate and ensure that a stress working condition of the wheel and suspension system is consistent with a real automobile high-speed running state.

In some embodiments, the first rotation driving assembly includes a high-speed motor, a gearbox and a first motor base, both the high-speed motor and the gearbox are fixed on the first motor base, and an output end of the high-speed motor is connected with a central rotation shaft of the high-speed rotary drum through the gearbox.

In some embodiments, the high-speed pavement rotary drum assembly further includes a first rotary drum base, a groove for containing the high-speed rotary drum is formed in the middle of the first rotary drum base, and a central rotation shaft of the high-speed rotary drum is fixed on the first rotary drum base through a bearing and a bearing seat.

In some embodiments, the impact pavement rotary drum assembly includes a second rotation driving assembly, a cobblestone pavement rotary drum and a speed bump pavement rotary drum, and the second rotation driving assembly can drive the cobblestone pavement rotary drum and the speed bump pavement rotary drum to rotate. In this embodiment, the structures and the sizes of a speed bump pavement and a cobblestone pavement on the impact pavement rotary drum assembly are kept consistent with those in a test field so that a road condition of the test field can be really reproduced.

In some embodiments, the second rotation driving assembly includes a low-speed motor, a small belt pulley, a big belt pulley, a belt and a second motor base, the low-speed motor is fixed on the second motor base, an output end of the low-speed motor is fixedly connected with the small belt pulley, the cobblestone pavement rotary drum and the speed bump pavement rotary drum are coaxially arranged, the big belt pulley is fixed on a central rotation shaft of the cobblestone pavement rotary drum and the speed bump pavement rotary drum, and the big belt pulley is connected with the small belt pulley through the belt.

In some embodiments, the impact pavement rotary drum assembly further includes a second rotary drum base, a groove for containing the cobblestone pavement rotary drum and the speed bump pavement rotary drum is formed in the middle of the second rotary drum base, and a central rotation shaft of the cobblestone pavement rotary drum and the speed bump pavement rotary drum is fixed on the second rotary drum base through a bearing and a bearing seat.

In some embodiments, the rotary drum switching assembly includes a horizontal sliding assembly and a mounting table, the horizontal sliding assembly can drive the mounting table to horizontally move, and the loading system is fixed on the mounting table.

In some embodiments, the horizontal sliding assembly includes a sliding block driving motor, a second screw rod, a third sliding block, a linear bearing, a third guide rail and a switching sliding table base, the third guide rail is fixed on a top surface of the switching sliding table base, the mounting table is connected with the third guide rail through the linear bearing, both the sliding block driving motor and the second screw rod are fixedly arranged on the switching sliding table base, an output end of the sliding block driving motor is fixedly connected with one end of the second screw rod, the third sliding block is fixedly connected with the mounting table, the third sliding block is provided with a second threaded hole, an external screw thread of the second screw rod is matched with an internal screw thread of the second threaded hole, and the sliding block driving motor can drive the second screw rod to rotate so as to enable the mounting table to move left and right.

Compared to the prior art, the present disclosure has the beneficial effects:

The present disclosure provides the fatigue test equipment for the automobile chassis simulation road test. The fatigue test equipment includes the suspension assembly, the loading system, the high-speed pavement rotary drum assembly, the impact pavement rotary drum assembly and the rotary drum switching assembly. The wheel is fixed on the suspension system, the loading system applies the lateral load, the vertical bumpiness load, the real automobile weight load and a loading inclination angle to the wheel through the movable plate and drives the wheel to rotate, and the rotary drum switching assembly can enable the loading system and the suspension assembly fixed on the loading system to be switched between the high-speed pavement rotary drum assembly and the impact pavement rotary drum assembly; the fatigue test equipment can simultaneously test the simulation road test fatigue durability of the automobile chassis parts such as the wheel and suspension system and the like, ensures that the test state of the tested wheel and suspension system is close to the real automobile state, simulates and reproduces the load which the automobile chassis bears in the real road running process in the laboratory, can simultaneously test the fatigue durability of the wheel and suspension system, and has universality; the wheel and suspension systems of various automobile types can be mounted, and the fatigue durability of the wheel and suspension systems of various automobile types can be tested; the development period of the finished automobile is shortened; and the development cost is reduced.

Figure 1:
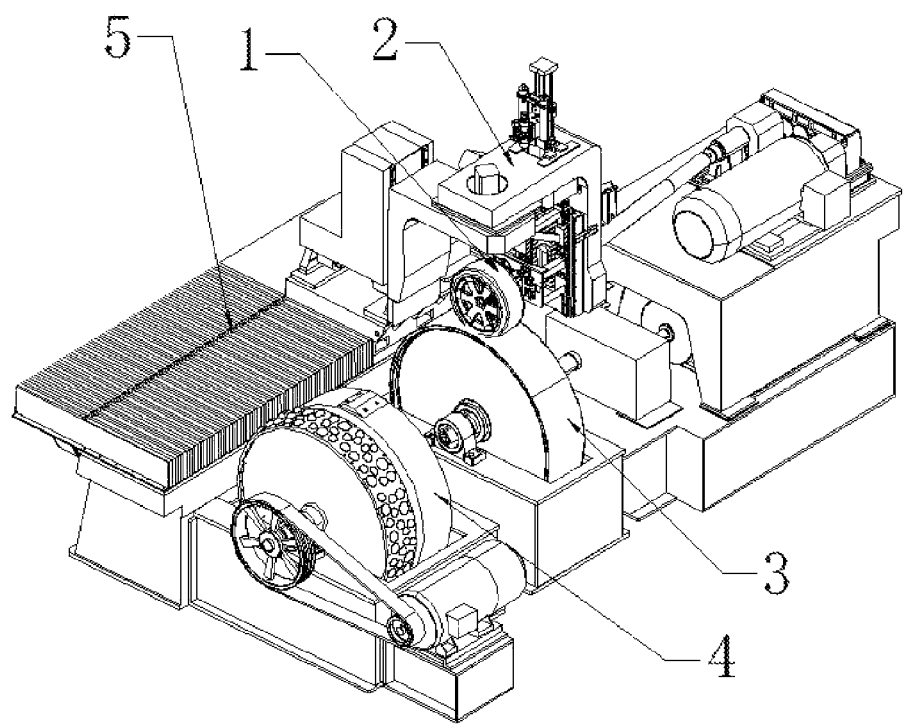
FIG. 1 is an overall structural schematic diagram of fatigue test equipment for an automobile chassis simulation road test according to the present application.

In the drawings, 1—suspension assembly; 2—loading assembly; 3—high-speed pavement rotary drum assembly; 4—impact pavement rotary drum assembly; 5—rotary drum switching assembly; 101—wheel; 102—quarter suspension; 103—suspension fixing frame; 104—adapter plate; 201—rotation angle loading arm; 202—six-component force measurement platform; 203—movable plate; 204—high-frequency response hydraulic cylinder; 205—rotation angle motor; 206—four-point contact bearing; 207—preloading arm; 208—preloading motor; 209—inclination angle machine body; 210—inclination angle base; 211—inclination angle electric cylinder; 212—acceleration torque driving shaft; 213—acceleration torque motor; 214—motor mounting table; 301—high-speed rotary drum; 302—first central rotation shaft; 303—bearing seat; 304—first rotary drum base; 305—gearbox; 306—high-speed motor; 307—first motor base; 401—cobblestone pavement rotary drum; 402—speed bump pavement rotary drum; 403—second central rotation shaft; 404—bearing seat; 405—rotary drum base; 406—big belt pulley; 407—small belt pulley; 408—belt; 409—low-speed motor; 410—second motor base; 501—mounting table; 502—second screw rod; 503—sliding block driving motor; 504—linear bearing; 505—third guide rail; 506—switching sliding table base; and 507—third sliding block.

DETAILED DESCRIPTION OF THE EMBODIMENTS

Embodiment 1

Embodiment 1 provides fatigue test equipment for an automobile chassis simulation road test, as shown in FIG. 1, including a suspension assembly 1, a loading system 2, a high-speed pavement rotary drum assembly 3, an impact pavement rotary drum assembly 4 and a rotary drum switching assembly 5. The suspension assembly 1 is mounted on the loading system 2. The suspension assembly 1 can be loaded onto the high-speed pavement rotary drum assembly 3 and the impact pavement rotary drum assembly 4 through a wheel. The rotary drum switching assembly 5 can enable the loading system 2 and the suspension assembly 1 fixed on the loading system 2 to be switched between the high-speed pavement rotary drum assembly 3 and the impact pavement rotary drum assembly 4, i.e., the rotary drum switching assembly 5 can enable the wheel fixed on the suspension assembly 1 to be switched between the high-speed pavement rotary drum assembly 3 and the impact pavement rotary drum assembly 4.

Figure 2:
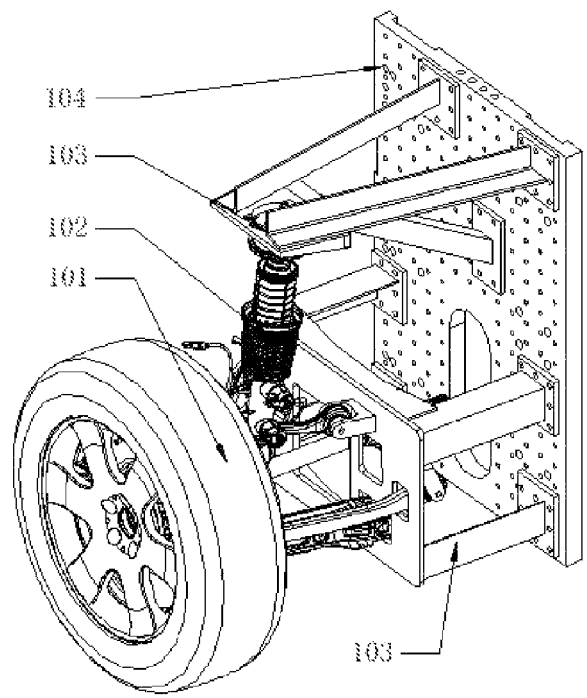
FIG. 2 is a structural schematic diagram of a suspension assembly of fatigue test equipment for an automobile chassis simulation road test according to the present application.

As shown in FIG. 2, the suspension assembly 1 includes an adapter plate 104, a suspension fixing frame 103 and a quarter suspension 102 for mounting the wheel 101. The quarter suspension 102 is fixed on the suspension fixing frame 103, and the suspension fixing frame 103 is fixed on the adapter plate 104. The wheel 101 and the quarter suspension 102 are mounted on the suspension fixing frame 103 according to a space layout of a real automobile, and the suspension fixing frame 103 is mounted on the adapter plate 104 through a bolt. Each bolt connection point is tightened and marked as required so as to facilitate viewing whether the bolt or a nut is anti-loose in the test process.

Figure 3:
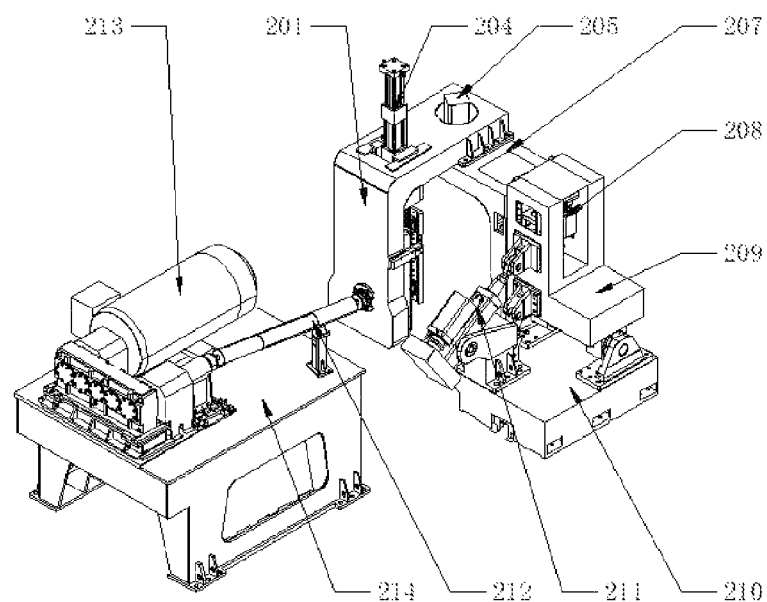
FIG. 3 is a structural schematic diagram of a loading system of fatigue test equipment for an automobile chassis simulation road test according to the present application.
Figure 4:
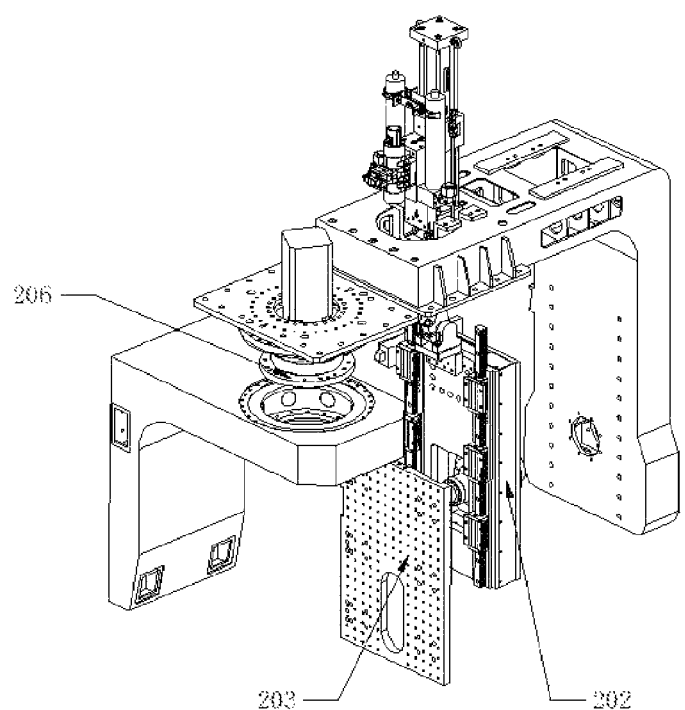
FIG. 4 is a partial structural schematic diagram of a loading system of fatigue test equipment for an automobile chassis simulation road test according to the present application.

As shown in FIGS. 3-4, the loading system 2 includes a lateral load loading assembly, a vertical load loading assembly, an automobile weight preliminary load loading assembly, an inclination angle loading assembly, a driving torque loading assembly and a movable plate 203. The lateral load loading assembly, the vertical load loading assembly, the automobile weight preliminary load loading assembly and the inclination angle loading assembly act on the movable plate 203. The adapter plate 104 is fixedly connected with the movable plate 203, both the adapter plate 104 and the movable plate 203 are provided with a plurality of rows of fixing holes, and the adapter plate 104 is fixed on the movable plate 203 through a bolt. The driving torque loading assembly acts on a transmission shaft of the quarter suspension 102, and drives the wheel 101 to carry out accelerated rotation.

As shown in FIG. 3, the inclination angle loading assembly includes an inclination angle machine body 209, an inclination angle base 210 and an inclination angle electric cylinder 211. A lower end of the inclination angle machine body 209 is fixed on the inclination angle base 210 in a pivotable mode through a bearing and rotation shaft mechanism, a bottom end of a shell of the inclination angle electric cylinder 211 is movably connected to the inclination angle base 210 through a first fixed bracket and a first hinge pin, a piston rod of the inclination angle electric cylinder 211 is movably connected to the inclination angle machine body 209 through a second fixed bracket and a second hinge pin, and extension and retraction of the piston rod of the inclination angle electric cylinder 211 can drive the inclination angle machine body 209 to rotate around a pivoting shaft so as to achieve an effect that an inclination angle of the tested suspension assembly 1 is the same as that of the real automobile.

The automobile weight preliminary load loading assembly includes a preloading motor 208, a first screw rod, a first sliding block and a preloading arm 207. The preloading motor 208 is fixed on the inclination angle machine body 209, an output shaft of the preloading motor 208 is fixedly connected with the first screw rod, the first sliding block is provided with a first threaded hole, an external screw thread of the first screw rod is matched with an internal screw thread of the first threaded hole, the first sliding block is fixed on the preloading arm 207, and the preloading motor 208 can drive the first screw rod to rotate so as to implement up-and-down movement of the preloading arm 207 and ensure that a preliminary load equal to an automobile weight of the real automobile is applied to the tested suspension assembly 1 within a reasonable stroke range of a hydraulic actuator (a high-frequency response hydraulic cylinder 204).

The lateral load loading assembly includes a rotation angle motor 205 and a rotation angle loading arm 201, a shell of the rotation angle motor 205 is connected with the rotation angle loading arm 201, a rotation shaft of the rotation angle motor 205 is fixedly connected with the preloading arm 207 through a four-point contact bearing 206, and the rotation angle motor 205 can drive the rotation angle loading arm 201 to rotate around the rotation shaft of the rotation angle motor 205 so as to simulate a working condition that the real automobile makes a turn on a road, and apply a lateral load to a tested wheel and suspension system. Both the preloading arm 207 and the rotation angle loading arm 201 are of an L shape, the shell of the rotation angle motor 205 and a horizontal portion of the rotation angle loading arm 201 are fixed into one whole body, and the rotation shaft of the rotation angle motor 205 is fixed on the horizontal portion of the preloading arm 207.

The vertical load loading assembly includes a hydraulic actuator. In this embodiment, the hydraulic actuator is the high-frequency response hydraulic cylinder 204 with the highest loading frequency of 60 Hz, the hydraulic actuator is fixed at an upper end of the rotation angle loading arm 201, the movable plate 203 is vertically fixed on the rotation angle loading arm 201, a piston rod of the high-frequency response hydraulic cylinder 204 is connected with an upper end of the movable plate 203, and the high-frequency response hydraulic cylinder 204 implements application of a wheel vertical bumpiness load by playing a preset load spectrum signal.

The driving torque loading assembly includes an acceleration torque driving shaft 212, an acceleration torque motor 213 and a motor mounting table 214, the acceleration torque motor 213 is fixed on the motor mounting table 214, an output end of the acceleration torque motor 213 is connected with the acceleration torque driving shaft 212, and the acceleration torque driving shaft 212 is fixedly connected with the transmission shaft of the quarter suspension 102. A torque sensor is also arranged between the output end of the acceleration torque motor 213 and the acceleration torque driving shaft 212 so as to measure and regulate driving torque in real time. As shown in FIG. 1 and FIG. 3, one end of the acceleration torque driving shaft 212 is connected with the transmission shaft of the quarter suspension 102, while the other end is connected with the acceleration torque motor 213 through the torque sensor, the acceleration torque motor 213 is fixed on the motor mounting table 214, and the acceleration torque motor 213 drives the wheel to carry out accelerated rotation through the acceleration torque driving shaft 212 so as to implement application of wheel acceleration driving torque.

The loading system 2 further includes a six-component force measurement platform 202, and the six-component force measurement platform 202 is formed by combining four three-component sensors. One surface of the six-component force measurement platform 202 is fixed on the rotation angle loading arm 201, and the movable plate 203 is fixed on the other surface of the six-component force measurement platform 202. A second guide rail is fixedly formed on the six-component force measurement platform 202, a second sliding block is arranged on the second guide rail, and the movable plate 203 is fixed on the second sliding block. As shown in FIG. 4, one surface of the six-component force measurement platform 202 is mounted on the rotation angle loading arm 201 in a bolt connection mode, while the other surface is connected with the movable plate 203 through a guide rail and sliding block mechanism, and the suspension assembly 1 is mounted on the movable plate 203 through a bolt.

Figure 5:
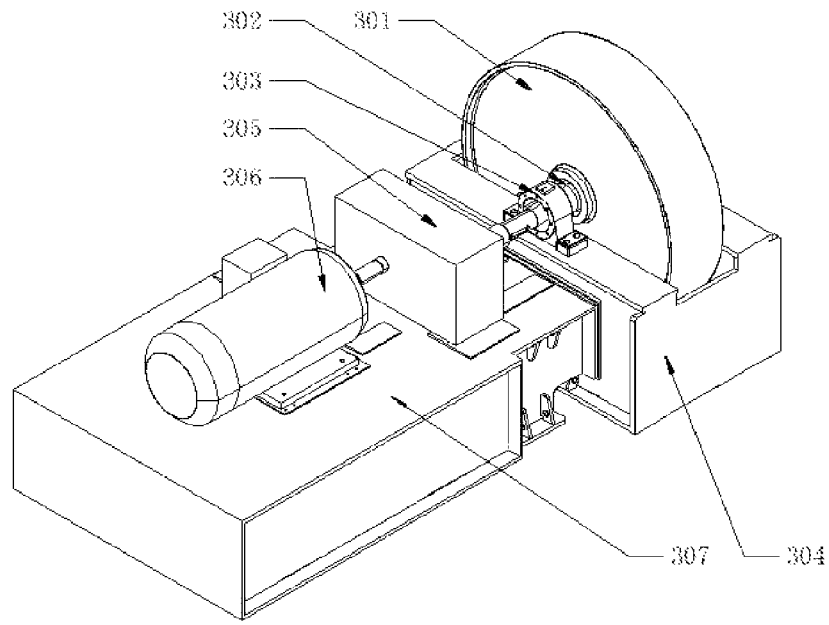
FIG. 5 is a structural schematic diagram of a high-speed pavement rotary drum assembly of fatigue test equipment for an automobile chassis simulation road test according to the present application.

As shown in FIG. 5, the high-speed pavement rotary drum assembly 3 includes a first rotation driving assembly and a high-speed rotary drum 301, and the first rotation driving assembly can drive the high-speed rotary drum 301 to rotate. As shown in FIG. 5, the first rotation driving assembly includes a high-speed motor 306, a gearbox 305 and a first motor base 307, both the high-speed motor 306 and the gearbox 305 are fixed on the first motor base 307, and an output end of the high-speed motor 306 is connected with a first central rotation shaft 302 of the high-speed rotary drum 301 through the gearbox 305. The high-speed pavement rotary drum assembly further includes a first rotary drum base 304, a groove for containing the high-speed rotary drum 301 is formed in the middle of the first rotary drum base 304, and the first central rotation shaft 302 of the high-speed rotary drum 301 is fixed on the first rotary drum base 304 through a bearing and a bearing seat 303. The high-speed pavement rotary drum assembly 3 has the maximum rotation speed of 500 r/min, and can simulate the maximum running speed of 180 km/h.

Figure 6:
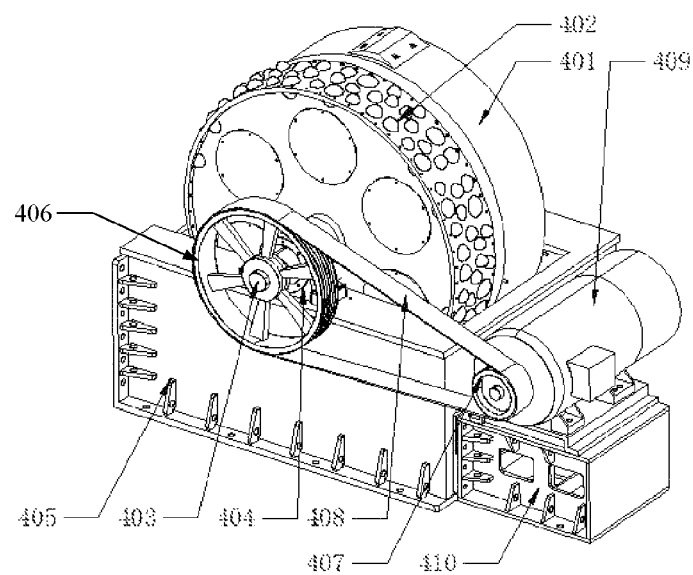
FIG. 6 is a structural schematic diagram of an impact pavement rotary drum assembly of fatigue test equipment for an automobile chassis simulation road test according to the present application.

As shown in FIG. 6, the impact pavement rotary drum assembly 4 includes a second rotation driving assembly, a cobblestone pavement rotary drum 401 and a speed bump pavement rotary drum 402, and the second rotation driving assembly can drive the cobblestone pavement rotary drum 401 and the speed bump pavement rotary drum 402 to rotate. The cobblestone pavement rotary drum 401 simulates a cobblestone pavement which is produced in equal proportion according to a cobblestone working condition of a test field, and is fixed to the rotary drum base through a bolt. The speed bump pavement rotary drum 402 simulates a speed bump which is produced in equal proportion according to a speed bump road condition of the test field, and is fixed to the surface of the rotary drum base through a bolt. The second rotation driving assembly includes a low-speed motor 409, a small belt pulley 407, a big belt pulley 406, a belt 408 and a second motor base 410, the low-speed motor 409 is fixed on the second motor base 410, and an output end of the low-speed motor 409 is fixedly connected with the small belt pulley 407. The cobblestone pavement rotary drum 401 and the speed bump pavement rotary drum 402 are coaxially arranged, the cobblestone pavement rotary drum 401 and the speed bump pavement rotary drum 402 are arranged on a second central rotation shaft 403 side by side, the big belt pulley 406 is fixed on the second central rotation shaft 403 of the cobblestone pavement rotary drum 401 and the speed bump pavement rotary drum 402, and the big belt pulley 406 is connected with the small belt pulley 407 through the belt 408. The big belt pulley 406 is matched with the second central rotation shaft 403, the small belt pulley 407 is matched with a rotation shaft of the low-speed motor 409, and the small belt pulley 407 drives the big belt pulley 406 to rotate through the belt 408 and simultaneously drives the rotary drums to rotate. The impact pavement rotary drum assembly 4 further includes a second rotary drum base 410, a groove for containing the cobblestone pavement rotary drum 401 and the speed bump pavement rotary drum 402 is formed in the middle of the second rotary drum base 410, and both ends of the second central rotation shaft 403 of the cobblestone pavement rotary drum 401 and the speed bump pavement rotary drum 402 are fixed on the second rotary drum base 410 through a bearing and a bearing seat 404.

Figure 7:
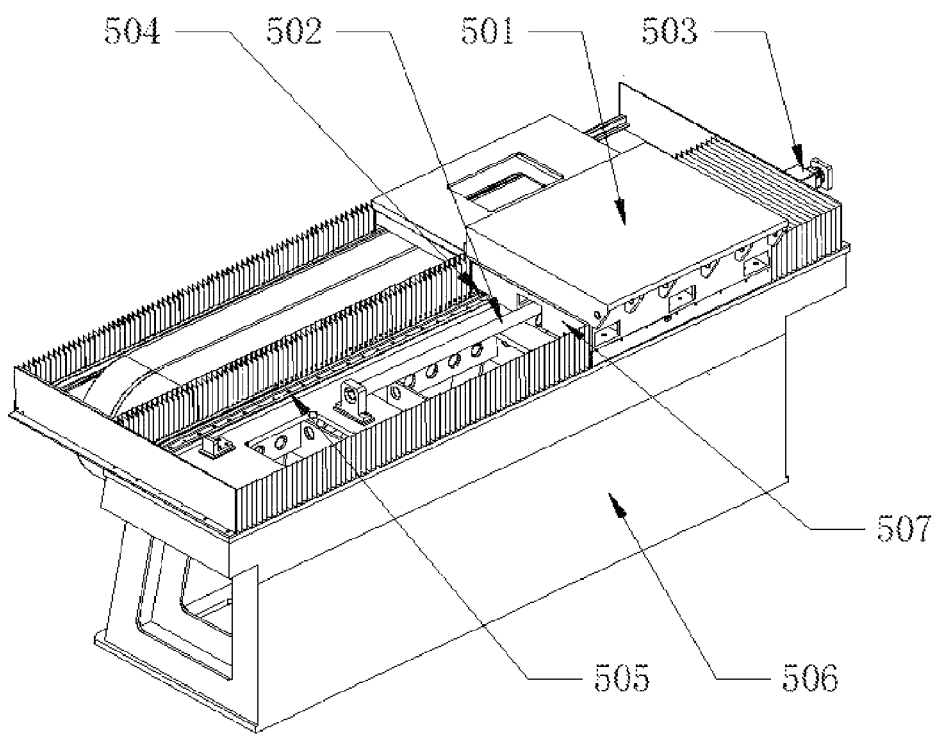
FIG. 7 is a structural schematic diagram of a rotary drum switching assembly of fatigue test equipment for an automobile chassis simulation road test according to the present application.

As shown in FIG. 7, the rotary drum switching assembly 5 includes a horizontal sliding assembly and a mounting table 501, the horizontal sliding assembly can drive the mounting table 501 to horizontally move, and the loading system 2 is fixed on the mounting table 501. The horizontal sliding assembly includes a sliding block driving motor 503, a second screw rod 502, a third sliding block 507, a linear bearing 504, a third guide rail 505 and a switching sliding table base 506. The third guide rail 505 is fixed on a top surface of the switching sliding table base 506, the mounting table 501 is connected with the third guide rail 505 through the linear bearing 504, both the sliding block driving motor 503 and the second screw rod 502 are fixedly arranged on the switching sliding table base 506, the output end of the sliding block driving motor 503 is fixedly connected with one end of the second screw rod 502, the third sliding block 507 is fixedly connected with the mounting table 501, the third sliding block 507 is provided with a second threaded hole, an external screw thread of the second screw rod 502 is matched with an internal screw thread of the second threaded hole, and the sliding block driving motor 503 can drive the second screw rod 502 to rotate so as to enable the third sliding block 507 and the mounting table 501 to move left and right.

The fatigue test equipment for the automobile chassis simulation road test in Embodiment 1 carries out the automobile chassis simulation road test.

(1) Test 1: High-Speed Pavement Impact Test of Automobile Chassis Simulation Road Test Firstly, experiment parameters are determined, test objects are a left rear wheel of a certain automobile type and a suspension system thereof, the external inclination angle of the wheel is 1.594°, the automobile dead weight is 2,145 kg, the full-load automobile weight is 2,825 kg, and a target load is an acquired road load spectrum file.

Then, the tested wheel and suspension assembly is assembled. Parts of a certain automobile type, such as a wheel and suspension system and the like, are purchased in the market, the wheel and the quarter suspension assembly are mounted on the suspension fixing frame according to the space layout of the real automobile, the suspension fixing frame is mounted on the adapter plate through the bolt, each bolt connection point is tightened and marked according to required torque so as to facilitate viewing whether the bolt or the nut is anti-loose in the test process, the tire is inflated to have the tire pressure of 200 kPa, and four strain gauges are adhered to a spoke, a wheel center, an outer rim and an inner rim of the wheel.

Next, the tested wheel and suspension assembly is mounted to the loading system. The adapter plate of the tested suspension assembly with the wheel of the real automobile is connected with the movable plate of the loading system through the bolt. A six-component sensor (the six-component force measurement platform) is mounted between the movable plate and the adapter plate.

Then, the external inclination angle of the wheel is regulated. The inclination angle electric cylinder drives an inclination angle loading arm to rotate around an inclination angle rotation shaft by 1.594° so as to drive a wheel and tire assembly to generate the external inclination angle of 1.594°.

Next, a high-speed rotary drum load is applied. The preloading motor drives the preloading arm to move downwards, so that the wheel and tire assembly is pressed on the high-speed rotary drum, and a vertical load equal to a quarter of a full-load automobile weight of 706.25 kg is generated. The high-speed rotary drum assembly, the rotation angle motor, the vertical load hydraulic actuator (the high-frequency response hydraulic cylinder which simulates the wheel vertical bumpiness load) and the acceleration torque motor are started up, and the high-speed rotary drum has the rotation speed of 120 km/h. Strain signals of the strain gauges adhered onto the wheel are acquired.

Damage is calculated. Statistic analysis of a strain amplitude and a cumulative frequency is carried out, and an actually measured wheel damage value is calculated in correspondence to a standard (strain amplitude)S-(frequency) N curve so as to obtain a high-speed simulation test damage result of an automobile chassis with the wheel and suspension system, as shown in Table 1 (Statistics of High-Speed Pavement Simulation Test Damage Result of High-Speed Rotary Drum).

TABLE 1

Statistics of High-speed Pavement Simulation Test Damage Result of High-speed Rotary Drum

| Test Group | Damage Value of Strain Gauge 1 | Damage Value of Strain Gauge 2 | Damage Value of Strain Gauge 3 | Damage Value of Strain Gauge 4 |
|---|---|---|---|---|
| High-speed Simulation Test | 1.4 | 1.4 | 1.5 | 1.2 |

(2) Test 2: Cobblestone Pavement Impact Test of Automobile Chassis Simulation Road Test The loading system in Embodiment 1 is switched to be positioned above the cobblestone pavement rotary drum, and the preloading motor drives the preloading arm to move downwards, so that the wheel is pressed on the impact pavement rotary drum, and a vertical load equal to a quarter of a full-load automobile weight of 706.25 kg is generated. The impact pavement rotary drum and the vertical load hydraulic actuator (the high-frequency response hydraulic cylinder which simulates the wheel vertical bumpiness load) are started up; the impact pavement rotary drum has the rotation speed of 40 km/h; the vertical load and a longitudinal load which the wheel bears are acquired in real time by the six-component sensor, and a relative damage value is subjected to statistics to obtain Table 2 (Statistics of Load and Damage Result of Cobblestone Pavement Simulation Test of Impact Rotary Drum).

TABLE 2

Statistics of Load and Damage Result of Cobblestone Pavement Simulation Test of Impact Rotary Drum

| Test Group | Maximum Vertical Load (kN) | Maximum Longitudinal Load (kN) | Average Related Damage Value |
|---|---|---|---|
| Impact Simulation Test | 21.02 | 15.21 | 1.17 |

Comparison Test 1: Road Simulation Tester Test of Wheel

The same type of wheel and tire assembly with Test 1 in Embodiment 1 is selected, strain gauges are adhered to the same positions on the wheel with the positions in Test 1 in Embodiment 1, a road simulation test of the wheel is carried out on a road simulation tester, the same target load file with Test 1 in Embodiment 1 is applied, strain signals in the loading process are acquired, and calculation is carried out to obtain a damage value of the wheel, as shown in Table 3 (High-speed Simulation Test Result of Road Simulation Tester for Wheel in Comparison Test 1).

TABLE 3

High-speed Simulation Test Result of Road Simulation Tester for Wheel in Comparison Test 1

| Test Group | Damage Value of Strain Gauge 1 | Damage Value of Strain Gauge 2 | Damage Value of Strain Gauge 3 | Damage Value of Strain Gauge 4 |
|---|---|---|---|---|
| High-speed Test on Simulation Tester | 1.3 | 1.4 | 1.6 | 1.3 |

Comparison Test 2: Real Automobile Cobblestone Pavement Impact Test

An enhanced durable section cobblestone road with the same parameters with the cobblestone pavement rotary drum is selected in a certain automobile test field, and the same type of automobile is tested. The automobile runs over two types of cobblestone pavements at the speed of 40 km/h. In order to ensure safety of a driver, an anti-rolling frame is mounted in a body, the driver wears safety clothing and wears a helmet. The front axle weight of the wheel is regulated into 900 kg, and the rear axle weight of the wheel is regulated into 706.25 kg. The driver drives the automobile to run over the cobblestone pavement (the running distance is the same as that in Test 2) at the speed of 40 km/h, a vertical load and a longitudinal load which the left rear wheel bears are acquired, a relative damage value is subjected to statistics, and a result is as shown in Table 4.

TABLE 4

Load and Damage Result Statistics of Real Automobile Cobblestone Pavement Impact Test in Comparison Test 2

| Test Group | Maximum Vertical Load (kN) | Maximum Longitudinal Load (kN) | Average Related Damage Value |
|---|---|---|---|
| Real Automobile Cobblestone Pavement Impact Test | 19.51 | 13.20 | 1 |

It can be seen from the test results that in case of adopting the same wheel and tire assembly and target load file, consistency between the wheel damage result obtained when the fatigue test equipment for the automobile chassis simulation road test according to the present application is adopted to carry out the automobile chassis high-speed pavement simulation test and the wheel damage result obtained when the road simulation tester for the wheel is adopted to carry out high-speed simulation test of the wheel is high, and the fatigue test equipment for the automobile chassis simulation road test according to the present application can apply the accurate load to the wheel and suspension system. In case of the same cobblestone pavement parameters, the vertical loads, the longitudinal loads and the related damage which are measured when the fatigue test equipment for the automobile chassis simulation road test according to the present application is adopted to carry out the automobile chassis cobblestone impact pavement simulation test and the real automobile cobblestone pavement impact test is adopted are high in consistency with the test result measured in the test field, and the cobblestone pavement test in the test field can be replaced.

What is claimed is:

1. A fatigue test equipment for an automobile chassis simulation road test, comprising:
   a suspension assembly;
   a loading system;
   a high-speed pavement rotary drum assembly;
   an impact pavement rotary drum assembly; and
   a rotary drum switching assembly,
   wherein the suspension assembly is mounted on the loading system,
   the suspension assembly is configured to be loaded onto the high-speed pavement rotary drum assembly and the impact pavement rotary drum assembly through a wheel; and
   the rotary drum switching assembly is configured to enable the wheel fixed on the suspension assembly to be switched between the high-speed pavement rotary drum assembly and the impact pavement rotary drum assembly,
   wherein the suspension assembly comprises:
   an adapter plate;
   a suspension fixing frame fixed on the adapter plate; and
   a quarter suspension for mounting the wheel, the quarter suspension is fixed on the suspension fixing frame.

2. The fatigue test equipment for the automobile chassis simulation road test according to claim 1, wherein the loading system comprises:
   a lateral load loading assembly;
   a vertical load loading assembly;
   an automobile weight preliminary load loading assembly;
   an inclination angle loading assembly;
   a driving torque loading assembly; and
   a movable plate;
   wherein the lateral load loading assembly, the vertical load loading assembly, the automobile weight preliminary load loading assembly and the inclination angle loading assembly act on the movable plate;
   the adapter plate is fixedly connected with the movable plate; and
   the driving torque loading assembly acts on a transmission shaft of the quarter suspension, and drives the wheel to carry out accelerated rotation.

3. The fatigue test equipment for the automobile chassis simulation road test according to claim 2,
   wherein the inclination angle loading assembly comprises:
   an inclination angle machine body,
   an inclination angle base, and
   an inclination angle electric cylinder,
   wherein a lower end of the inclination angle machine body is fixed on the inclination angle base in a pivotable mode,
   a bottom end of the inclination angle electric cylinder is movably connected to the inclination angle base,
   a piston rod of the inclination angle electric cylinder is movably connected to the inclination angle machine body, and extension and retraction of the piston rod of the inclination angle electric cylinder drive the inclination angle machine body to rotate around a pivoting shaft;
wherein the automobile weight preliminary load loading assembly comprises:
a preloading motor fixed on the inclination angle machine body,
a first screw rod, an output shaft of the preloading motor is fixedly connected with the first screw rod,
a preloading arm, and
a first sliding block fixed on the preloading arm and provided with a first threaded hole, an external screw thread of the first screw rod is matched with an internal screw thread of the first threaded hole,
wherein the preloading motor is configure to drive the first screw rod to rotate so as to implement up-and-down movement of the preloading arm;
wherein the lateral load loading assembly comprises:
a rotation angle motor, and
a rotation angle loading arm,
wherein a shell of the rotation angle motor is connected with the rotation angle loading arm,
a rotation shaft of the rotation angle motor is fixedly connected with the preloading arm, and
the rotation angle motor is configured to drive the rotation angle loading arm to rotate around the rotation shaft of the rotation angle motor;
wherein the vertical load loading assembly comprises:
a hydraulic actuator fixed at an upper end of the rotation angle loading arm,
wherein the movable plate is vertically fixed on the rotation angle loading arm, and
a piston rod of the hydraulic actuator is connected with an upper end of the movable plate; and
wherein the driving torque loading assembly comprises:
an acceleration torque driving shaft,
a motor mounting table, and
an acceleration torque motor fixed on the motor mounting table,
wherein an output end of the acceleration torque motor is connected with the acceleration torque driving shaft, and
the acceleration torque driving shaft is fixedly connected with the transmission shaft of the quarter suspension.

4. The fatigue test equipment for the automobile chassis simulation road test according to claim 3, wherein
both the preloading arm and the rotation angle loading arm are of an L shape,
the shell of the rotation angle motor and a horizontal portion of the rotation angle loading arm are fixed into one whole body, and
the rotation shaft of the rotation angle motor is fixed on the horizontal portion of the preloading arm.

5. The fatigue test equipment for the automobile chassis simulation road test according to claim 3, wherein both the adapter plate and the movable plate are provided with a plurality of rows of fixing holes.

6. The fatigue test equipment for the automobile chassis simulation road test according to claim 3, wherein the loading system further comprises:
a six-component force measurement platform,
wherein one surface of the six-component force measurement platform is fixed on the rotation angle loading arm, and
the movable plate is fixed on the other surface of the six-component force measurement platform.

7. The fatigue test equipment for the automobile chassis simulation road test according to claim 6, wherein
a second guide rail is fixedly formed on the six-component force measurement platform,
a second sliding block is arranged on the second guide rail, and
the movable plate is fixed on the second sliding block.

8. The fatigue test equipment for the automobile chassis simulation road test according to claim 1, wherein the high-speed pavement rotary drum assembly comprises:
a first rotation driving assembly; and
a high-speed rotary drum,
wherein the first rotation driving assembly is configured to drive the high-speed rotary drum to rotate.

9. The fatigue test equipment for the automobile chassis simulation road test according to claim 8, wherein the first rotation driving assembly comprises:
a high-speed motor;
a gearbox; and
a first motor base,
wherein both the high-speed motor and the gearbox are fixed on the first motor base, and
an output end of the high-speed motor is connected with a central rotation shaft of the high-speed rotary drum through the gearbox.

10. The fatigue test equipment for the automobile chassis simulation road test according to claim 8, wherein the high-speed pavement rotary drum assembly further comprises:
a first rotary drum base,
wherein a groove for containing the high-speed rotary drum is formed in the middle of the first rotary drum base, and
a central rotation shaft of the high-speed rotary drum is fixed on the first rotary drum base through a bearing and a bearing seat.

11. The fatigue test equipment for the automobile chassis simulation road test according to claim 8, wherein the impact pavement rotary drum assembly comprises:
a second rotation driving assembly;
a cobblestone pavement rotary drum; and
a speed bump pavement rotary drum,
wherein the second rotation driving assembly is configured to drive the cobblestone pavement rotary drum and the speed bump pavement rotary drum to rotate.

12. The fatigue test equipment for the automobile chassis simulation road test according to claim 1, wherein the impact pavement rotary drum assembly comprises:
a second rotation driving assembly;
a cobblestone pavement rotary drum; and
a speed bump pavement rotary drum,
wherein the second rotation driving assembly is configured to drive the cobblestone pavement rotary drum and the speed bump pavement rotary drum to rotate.

13. The fatigue test equipment for the automobile chassis simulation road test according to claim 12, wherein the second rotation driving assembly comprises:
a low-speed motor;
a small belt pulley;
a big belt pulley;
a belt; and
a second motor base,
wherein the low-speed motor is fixed on the second motor base, an output end of the low-speed motor is fixedly connected with the small belt pulley,
the cobblestone pavement rotary drum and the speed bump pavement rotary drum are coaxially arranged, the big belt pulley is fixed on a central rotation shaft of the cobblestone pavement rotary drum and the speed bump pavement rotary drum, and the big belt pulley is connected with the small belt pulley through the belt.

14. The fatigue test equipment for the automobile chassis simulation road test according to claim 12, wherein the impact pavement rotary drum assembly further comprises:

a second rotary drum base, wherein a groove for containing the cobblestone pavement rotary drum and the speed bump pavement rotary drum is formed in the middle of the second rotary drum base, and a central rotation shaft of the cobblestone pavement rotary drum and the speed bump pavement rotary drum is fixed on the second rotary drum base through a bearing and a bearing seat.

15. The fatigue test equipment for the automobile chassis simulation road test according to claim 1, wherein the rotary drum switching assembly comprises:

a horizontal sliding assembly; and a mounting table, wherein the horizontal sliding assembly is configured to drive the mounting table to horizontally move, and the loading system is fixed on the mounting table.

16. The fatigue test equipment for the automobile chassis simulation road test according to claim 15, wherein the horizontal sliding assembly comprises:

A sliding block driving motor;

a second screw rod;

a third sliding block;

a linear bearing;

a third guide rail; and a switching sliding table base, wherein the third guide rail is fixed on a top surface of the switching sliding table base, the mounting table is connected with the third guide rail through the linear bearing, both the sliding block driving motor and the second screw rod are fixedly arranged on the switching sliding table base, an output end of the sliding block driving motor is fixedly connected with one end of the second screw rod, the third sliding block is fixedly connected with the mounting table, the third sliding block is provided with a second threaded hole, an external screw thread of the second screw rod is matched with an internal screw thread of the second threaded hole, and the sliding block driving motor is configured to drive the second screw rod to rotate so as to enable the mounting table to move left and right.

* * * * *